No. 856,178. PATENTED JUNE 4, 1907.
J. B. NEIL.
COTTON PICKER.
APPLICATION FILED MAY 26, 1906.

3 SHEETS—SHEET 3.

WITNESSES:
E. F. Stewart
Herbert D. Lawson

Joseph B. Neil  INVENTOR
By C. A. Snow & Co
ATTORNEYS

UNITED STATES PATENT OFFICE.

JOSEPH B. NEIL, OF FILBERT, SOUTH CAROLINA, ASSIGNOR OF ONE-HALF TO HARRY E. NEIL, OF FILBERT, SOUTH CAROLINA.

COTTON-PICKER.

No. 856,178.  Specification of Letters Patent.  Patented June 4, 1907.

Application filed May 26, 1906. Serial No. 318,938.

To all whom it may concern:

Be it known that I, JOSEPH B. NEIL, a citizen of the United States, residing at Filbert, in the county of York and State of South Carolina, have invented a new and useful Cotton-Picker, of which the following is a specification.

This invention relates to machines for picking cotton its primary object being to provide a machine of this character which can be drawn along a row of plants and which will pull the cotton therefrom.

Another object is to provide a machine of this character adapted to embrace and compress the plants so that practically all of the cotton thereon will be contacted by the picking means.

A still further object is to employ devices which will hold the twigs and leaves of the plants away from the picking means so that there will be little if any danger of any material other than the cotton being discharged upon the conveyers.

Another object is to provide means for maintaining the plants substantially upright during the operation of removing the cotton therefrom.

A still further object is to provide picking devices which will automatically adjust themselves to plants of different sizes.

With the above and other objects in view the invention consists of a movable frame carrying picking frames which are mounted to swing at their forward ends on vertical shafts constituting pivots. Each of these picking frames has a plurality of picking rollers disposed in the same vertical plane and preferably substantially horizontal. Guard rollers preferably in the form of worms are disposed close to the picking rollers but project beyond said rollers toward the center of the machine. Cleaning rollers are arranged in rear of the picking rollers for the purpose of removing cotton therefrom and all of the rollers within the frames are driven from the pivot shafts which in turn receive motion from a drive shaft actuated by the supporting wheels.

The invention also consists of certain other novel features of construction and combinations of parts which will be hereinafter more fully described and pointed out in the claims.

In the accompanying drawings is shown the preferred form of the invention.

Figure 1:
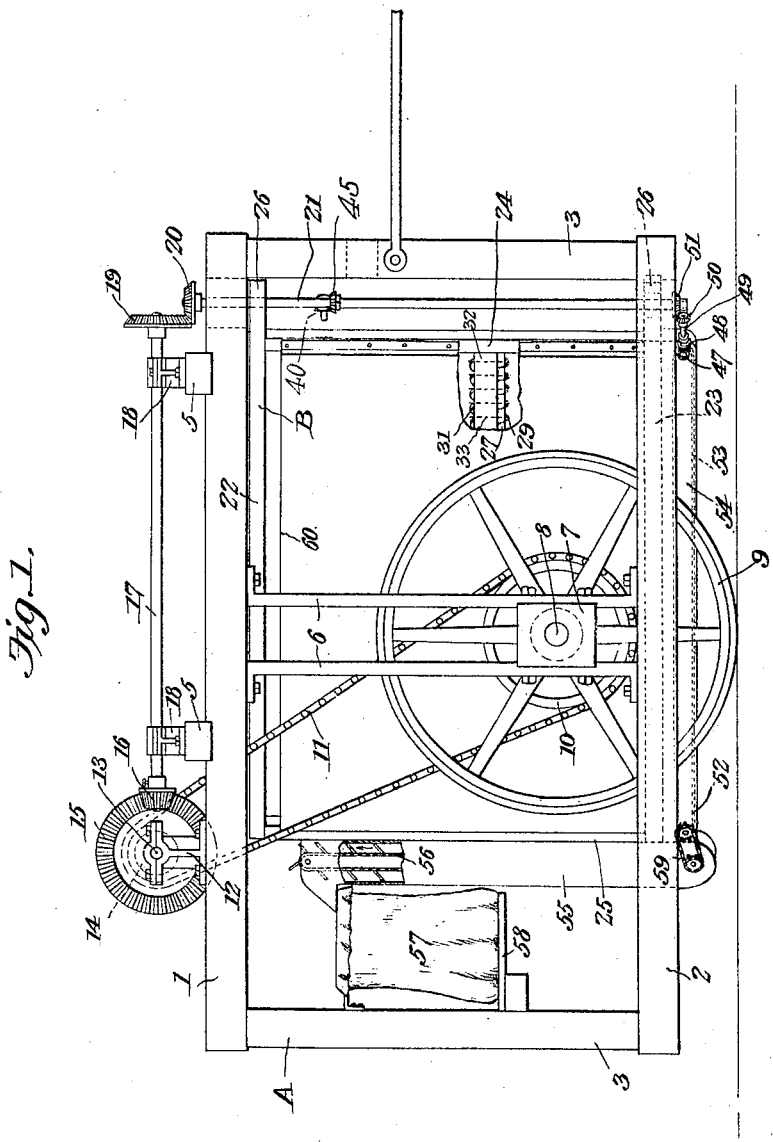
Figure 2:
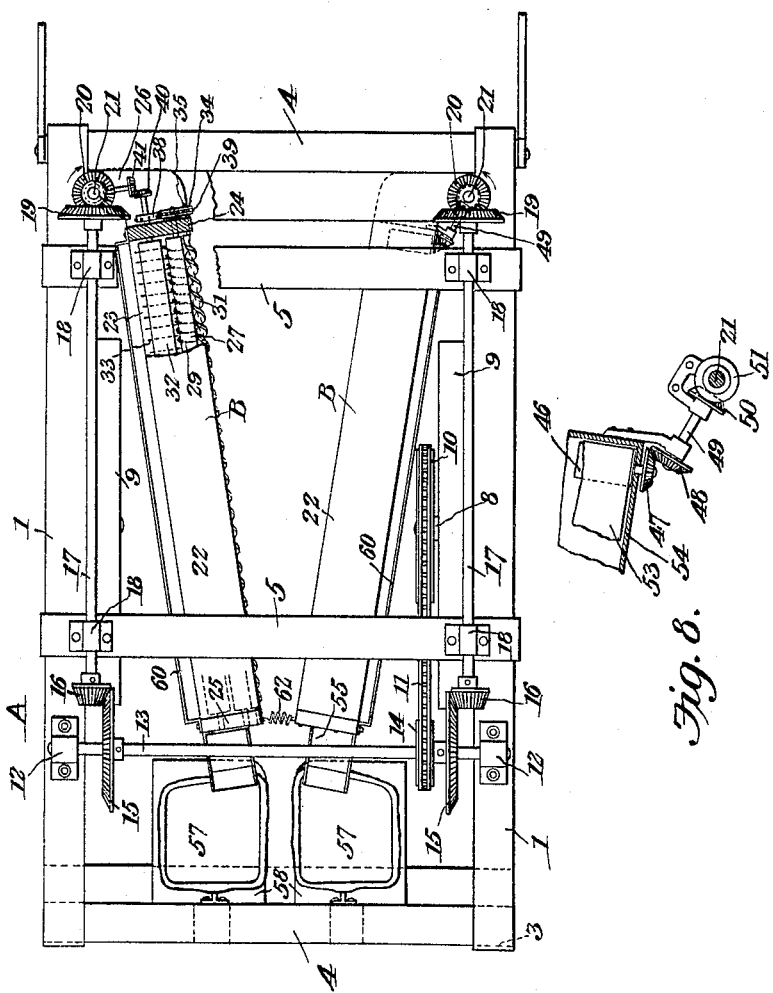
Figure 3:
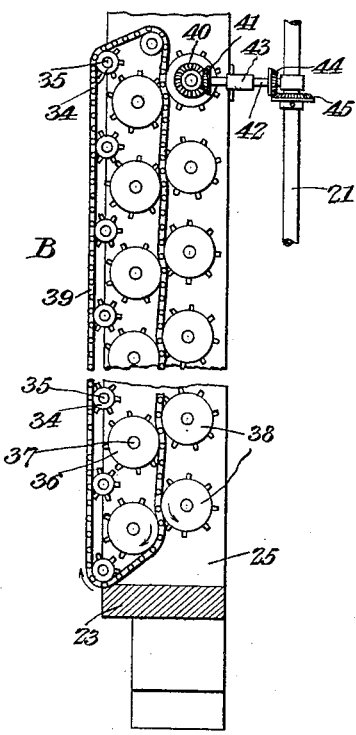
Figure 4:
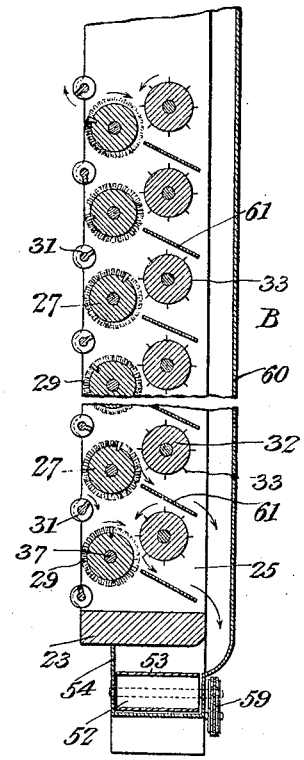
Figure 6:
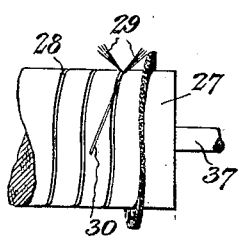
Figure 5:
Figure 7:
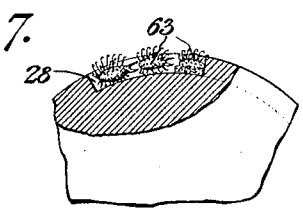

In said drawings: Figure 1 is a side elevation of the machine a portion thereof being broken away, and the mechanism for operatively connecting the various guide rollers, picking rollers, and cleaning rollers being removed from the front end of the picking frame. Fig. 2 is a plan view; Fig. 3 is an end view of the lower portion of one of the picking frames and showing the mechanism for transmitting motion from one of the pivot shafts to the rollers carried by its picking frame; Fig. 4 is a vertical section through the lower portion of one of the picking frames; Fig. 5 is an elevation of a portion of one of the guard rollers; Fig. 6 is an elevation of a portion of one of the picking rollers, some of the bristles being shown partly fastened thereto; Fig. 7 is a detail view showing a portion of a modified form of picking roller; and Fig. 8 is a detail view of the mechanism for transmitting motion to the carrier.

Referring to the figures by characters of reference, A is the main frame of the machine the same being preferably rectangular in outline and consisting of upper and lower side beams 1 and 2 connected by upstanding end beams 3 while the top beams are secured rigidly together by means of cross beams 4 disposed at the ends thereof and intermediate beams 5. Parallel guides 6 are secured between the upper and lower beams of the frame and mounted between them are slides 7 each carrying a trunnion 8 on which is rotatably mounted a supporting wheel 9. A sprocket 10 rotates with one of these wheels and drives a chain 11. Standards 12 are mounted on the top beams 1 near their rear ends and support a drive shaft 13 on which is secured a sprocket 14 supporting the chain 11. A beveled gear 15 is secured to the drive shaft 13 near each end and each of these gears meshes with a small gear 16 secured to one end of a shaft 17 journaled in standards 18 arranged on the top beam 1. Each shaft 17 extends longitudinally of the top beam thereunder and has a gear 19 at its forward end which meshes with a gear 20 arranged at the upper end of a vertical shaft 21 journaled in the forward ends of the beams 1 and 2 close to the front beam 3.

A picking frame B is connected to each side of the main frame A and each of these picking frames is preferably substantially rectangular in outline and consisting of top and bottom strips 22 and 23 connected at their ends by front and rear strips 24 and 25 respectively. Ears 26 extend forward from the beams 22 and 23 and are pivotally mounted on the shafts 21, the ear 26 of beam 23 overlapping and being supported by the lower beam 2 of the main frame A.

A series of horizontal picking rollers 27 is mounted in each of the frames B, said rollers being disposed in vertical alinement. Each roller has a spiral groove 28 cut thereinto in which short tufts 29 of bristles or other desired material are secured as by lapping a wire 30 within the grooves. Journaled in each frame B is also a series of horizontal guard rollers 31 disposed in vertical alinement and each roller being placed in front of the pass between two of the picking rollers 27. These guard rollers are preferably in the form of worms as shown in Fig. 5 and project beyond the inner edges of the frame B for the purpose hereinafter stated. Arranged within each frame B is a plurality of cleaning rollers 32 each roller being arranged adjacent the outer ends of the pass between two of the picking rollers and these cleaning rollers have short teeth 33 extending from them and adapted to remove cotton from the picking rollers.

A sprocket 34 is arranged at the front end of the shaft 35 of each guard roller 31. A sprocket 36 is also secured to the front end of the shaft 37 of each picking roller and a sprocket 38 is arranged at the front end of each cleaning roller. All of the sprockets 34, 36 and 38 on each frame B are arranged in the same vertical plane, and an endless chain 39 is disposed between the sprockets 36 and 38 and extends into engagement with the outwardly projecting portions of the sprockets 34 so that when the chain is moved in one direction the sprockets and the rollers to which they are connected will move in the directions indicated by the arrows in Fig. 3.

A beveled gear 40 rotates with one of the sprockets 38 and meshes with gear 41. This last mentioned gear is secured to a shaft 42 journaled within a bracket 43 extending from the front end of frame B and a gear 44 is also secured to said shaft 42 and meshes with a gear 45 on the shaft 21.

A roller 46 is supported below the front end of the beam 23 and has a gear 47 rotatable therewith and meshing with a gear 48 on a shaft 49. This shaft is adapted to swing with the frame B and has a gear 50 thereon which meshes with a gear 51 on the lower portion of shaft 21. Another roller 52 is supported under the rear end of beam 23 and on these rollers 46 and 52 is mounted an endless belt 53 inclosed within a casing 54. This belt is adapted to discharge material into the lower end of an upstanding casing 55 carried at the rear end of frame B and an elevator 56 of any desired construction is mounted within the casing 55. This elevator is adapted to discharge material into bags 57 supported on platforms 58 secured to the rear ends of the frame A. The elevator may be driven in any desired manner as by means of a chain 59 operated by a sprocket connected to the roller 52.

The outer portions of the frames B are preferably covered with fabric as shown at 60 which serves to deflect picked material on to the conveyer belt 53 as shown particularly in Fig. 4. Inclined partitions 61 are interposed between the cleaning rollers so as to direct material from said rollers and toward the fabric 60. A spring 62 is secured between the rear ends of the frame B for the purpose of holding them normally drawn together but this spring will permit said frames to spread apart when subjected to sufficient pressure.

The machine herein described is adapted to be drawn forward in any preferred manner so as to straddle a row of cotton plants which will be free to enter between the front ends of the frames B without hindrance but as they approach the rear ends of the frames B the plants will be compressed because of the tension exerted by the spring 62. The rotation of the supporting wheels will result in the transmission of motion therefrom to drive shaft 13 and thence through each shaft 17 and its gears to the pivot shaft 21 the gears 45 and 44 together with shaft 42 will result in the transmission of motion through gears 40 and 41 to one of the sprockets 38 and said sprocket will drive the chain 39 so as to cause the simultaneous rotation of all of the sprockets 34, 36 and 38. The guard rollers 31 will therefore be rotated in the direction of the arrows shown in Figs. 4 and 5 and by reason of their peculiar shape will tend to push the plants backward as the machine moves forward thereby maintaining them substantially upright. These rollers 31 also serve to hold the twigs and leaves away from the picking rollers which in rotating bring their bristles against the cotton bolls and pull the cotton away from the plants. This spiral arrangement of the bristles on the picking rollers is employed so as to assist the guard rollers in pushing the plants rearwardly. The teeth on the cleaning rollers remove the cotton from the picking rollers and discharge it onto the inclined shelves or partitions 61 from which the cotton drops on to the endless conveyer 53, is discharged on to the elevator, and then delivered to the bags 57.

Instead of arranging bristles within the groove 28 of each picking roller, glue may be placed within the groove and cockle burs 63 placed therein so as to partly project from the periphery of the roller as shown in Fig. 7. These burs are very plentiful in cotton growing regions and are particularly adapted therefore for use in removing the cotton because they can be collected and assembled with practically no cost.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. In a machine of the character described the combination with a portable frame; of swinging frames mounted upon vertical pivots within said portable frame, a resilient connection between the swinging frames, picking rollers carried by the swinging frames, and guard rollers carried by the swinging frames and projecting beyond the picking rollers.

2. In a machine of the character described the combination with a portable frame; of swinging frames mounted upon vertical pivots within said portable frame, a resilient connection between the swinging frames, picking rollers carried by the swinging frames, and means carried by the frames for moving the plants opposite to the direction of travel of the machine.

3. In a machine of the character described the combination with a portable frame; of swinging frames mounted upon vertical pivots within said portable frame, a resilient connection between the swinging frames, picking rollers carried by the swinging frames, and rotatable worms carried by the frames and projecting beyond the picking rollers.

4. In a machine of the character described the combination with a portable frame; of swinging frames mounted upon vertical pivots within said portable frame, a resilient connection between the swinging frames, picking rollers carried by the swinging frames, rotatable worms carried by the frames and projecting beyond the picking rollers, and cleaning rollers adjacent the picking rollers.

5. In a machine of the character described the combination with a portable frame; of swinging frames mounted upon vertical pivots within said portable frame, a resilient connection between the swinging frames, picking rollers carried by the swinging frames, rotatable worms carried by the frames and projecting beyond the picking rollers, cleaning devices adjacent the picking rollers, and means operated by the movement of the machine for actuating the rollers, worms, and cleaning devices.

6. In a machine of the character described the combination with a spirally grooved roller and an adhesive partly filling the groove; of cockle burs partly embedded within the adhesive and extending from the groove.

7. In a machine of the character described the combination with a portable frame; of swinging frames mounted upon vertical pivots within said portable frame, a resilient connection between the swinging frames, picking rollers carried by the swinging frames, rotatable worms parallel with and interposed between and extending beyond the peripheries of the picking rollers, and means operated by the movement of the portable frame for simultaneously rotating the picking rollers and worms.

8. In a machine of the character described the combination with a portable frame; of revoluble picking devices carried by the frame, and substantially horizontal revoluble guard devices upon the frame and parallel with and partly interposed between the picking devices, said guard devices extending beyond the peripheries of the picking devices and in the direction of movement of the frame for maintaining plants in an upright position during the picking operation, the axes of the picking and the guard devices being substantially parallel.

9. In a machine of the character described the combination with a portable frame; of picking devices carried by the frame and horizontally disposed rotatable guard devices upon the frame and between and parallel with the picking devices, said guard devices projecting beyond the peripheries of the picking devices and in the direction of the movement of the frame for maintaining plants in an upright position during said movement of the frame.

10. In a machine of the character described the combination with a portable frame; of picking devices carried by the frame, horizontally disposed guard devices upon the frame and between and parallel with the picking devices, said guard devices extending beyond the peripheries of the picking devices and in the direction of the movement of the frame for maintaining plants in upright positions during the picking operation, and cleaning devices parallel with and partly interposed between the picking devices.

11. In a machine of the character described the combination with resiliently connected portable frames constituting plant compressing devices; of picking rollers carried by the frames, worms parallel with and interposed between said rollers, said worms extending beyond the peripheries of the picking rollers and into the direction of movement of the machine and constituting means for supporting compressed plants in upright positions during the picking operation, and means operated by the movement of the machine for actuating the worms and picking rollers.

In testimony that I claim the foregoing as my own, I have hereto affixed my signature in the presence of two witnesses.

JOSEPH B. NEIL.

Witnesses:
J. A. TATE,
JOHN R. LOGAN.